US012037225B2

(12) United States Patent
Strahl et al.

(10) Patent No.: US 12,037,225 B2
(45) **Date of Patent: *Jul. 16, 2024**

(54) WORK AREA MONITORING SYSTEM FOR LIFTING MACHINES

(71) Applicant: Tulsa Winch, Inc., Jenks, OK (US)

(72) Inventors: Shane Strahl, Jenks, OK (US); Tony Jones, Bixby, OK (US)

(73) Assignee: DELAWARE CAPITAL FORMATION, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/676,641

(22) Filed: Feb. 21, 2022

(65) Prior Publication Data

US 2022/0185637 A1 Jun. 16, 2022

Related U.S. Application Data

(63) Continuation of application No. 16/227,888, filed on Dec. 20, 2018, now Pat. No. 11,254,547.

(60) Provisional application No. 62/625,676, filed on Feb. 2, 2018.

(51) Int. Cl.

| | |
|---|---|
| ***B66C 13/46*** | (2006.01) |
| ***B66C 13/08*** | (2006.01) |
| ***B66C 15/06*** | (2006.01) |
| ***B66C 23/90*** | (2006.01) |
| *B66C 15/04* | (2006.01) |

(52) U.S. Cl.

CPC ............ *B66C 13/46* (2013.01); *B66C 13/085* (2013.01); *B66C 15/065* (2013.01); *B66C 23/905* (2013.01); *B66C 15/045* (2013.01); *B66C 2700/082* (2013.01)

(58) Field of Classification Search

CPC ..... B66C 13/46; B66C 13/085; B66C 15/065; B66C 23/905; B66C 15/045; B66C 2700/082

See application file for complete search history.

(56) References Cited

U.S. PATENT DOCUMENTS

| | | | | |
|---|---|---|---|---|
| 2011/0187548 | A1* | 8/2011 | Maynard | B66C 15/045 340/685 |
| 2013/0299440 | A1* | 11/2013 | Hermann | B66C 15/065 340/8.1 |
| 2015/0144582 | A1 | 5/2015 | Ford et al. | |
| 2016/0176686 | A1 | 6/2016 | Schoonmaker | |
| 2017/0217737 | A1 | 8/2017 | Rudy et al. | |
| 2017/0369288 | A1 | 12/2017 | Fulton et al. | |
| 2019/0071289 | A1 | 3/2019 | Mayer | |
| 2019/0292024 | A1* | 9/2019 | Ishikawa | B66C 13/16 |

* cited by examiner

*Primary Examiner* — Rodney A Butler

(74) *Attorney, Agent, or Firm* — GableGotwals; David G. Woodral

(57) ABSTRACT

A system includes a hoist drive mechanism that elevates and lowers a load hook from a boom and a detector that provides obstacle location and identification information. A processor receives the obstacle location and identification information from the detector and provides obstacle avoidance data in response thereto.

10 Claims, 5 Drawing Sheets

WORK AREA MONITORING SYSTEM FOR LIFTING MACHINES

CROSS-REFERENCE TO RELATED CASES

This application claims the benefit of U.S. patent application Ser. No. 16/227,888, filed on Dec. 20, 2018 which claims benefit to U.S. provisional patent application Ser. No. 62/625,676, filed on Feb. 2, 2018, and incorporates such provisional application by reference into this disclosure as if fully set out at this point.

FIELD OF THE INVENTION

This disclosure relates to work area safety in general and, more particularly (but not by way of limitation), to monitoring work area of lifting machines.

BACKGROUND OF THE INVENTION

Construction sites and work areas are often dynamic and not well defined over long periods of time. As structures are removed, modified, or built, work areas change. Even when a work area remains stable for a period of time, hazards and obstacles within the area may not remain the same. Materials, vehicles, and other obstacles must be accounted for in a work area.

In the case of lifting machines (e.g., a crane) it is important to know placement, height, and other orientation details of hazards of obstacles that may be located within a defined work area. Further, loads may be lifted over some obstacles but not others. It may be acceptable to move a load over a pallet of lumber or a pile of bricks but far less expedient to move a load over a vehicle.

What is needed is a system and method for addressing the above, and related, concerns.

SUMMARY OF THE INVENTION

The invention of the present disclosure, in one aspect thereof, comprises a system for avoidance of obstacles by a crane. The system includes a rotational drive mechanism that rotates a boom of the crane relative to a base of the crane on a support surface, a hoist drive mechanism that elevates and lowers a load hook from the boom, a detector that provides obstacle location and identification information, and a processor that receives the obstacle location and identification information from the detector and provides obstacle avoidance data in response thereto.

The system may include a rotational drive mechanism controller that receives control signals from the processor to halt rotation of the boom when the obstacle location and identification information is determined by the processor to indicate an obstacle within a predetermined distance of the load hook. In some embodiments, the system includes a hoist drive mechanism controller that receives control signals from the processor to halt lowering of the load hook when the obstacle location and identification information is determined by the processor to indicate an obstacle within a predetermined distance of the load hook.

The system may further include a rotational drive mechanism controller that receives rotational drive control signals from the processor to halt rotation of the boom when the obstacle location and identification information is determined by the processor to indicate an obstacle within a predetermined horizontal distance of the load hook, and a hoist drive mechanism controller that receives hoist drive control signals from the processor to halt lowering of the load hook when the obstacle location and identification information is determined by the processor to indicate that the obstacle is within a predetermined vertical distance of the load hook.

In various embodiments, the detector comprises an optical camera, a radar, a sonic, or a laser.

The system may further comprise a mapper that provides a base map of an operating area, including known static obstacles, to the processor. The processor may provide obstacle avoidance data in response thereto. The system may have an alarm that is activated by the processor when the obstacle location and identification information is determined by the processor to indicate an obstacle within a predetermined distance of the load hook. The obstacle location and identification information may be utilized by the processor to determine whether a detected obstacle belongs to a class of obstacles over which the load hook may be lifted.

The invention of the present disclosure, in another aspect thereof, comprises a system for avoidance of obstacles by a crane when moving a load. The system includes a detector that provides obstacle location information, a processor that receives the obstacle location and identification information from the detector and determines obstacle avoidance data in response thereto. A rotational drive mechanism rotates a boom of the crane relative to a base of the crane on a support surface, and a hoist drive mechanism elevates and lowers a load from the boom. The system has a rotational drive mechanism controller that receives control signals from the processor based on the obstacle avoidance data to control rotation of the boom when the obstacle location and identification information is determined by the processor to indicate an obstacle within a predetermined horizontal distance of the load. The system also includes a hoist drive mechanism controller that receives control signals from the processor based on the obstacle avoidance data to control elevation of the load when the obstacle location and identification information is determined by the processor to indicate the obstacle is within a predetermined vertical distance of the load.

In some embodiments, the processor provides control signals to the hoist drive mechanism controller to stop lowering the load from the boom when the obstacle location and identification information is determined by the processor to indicate an obstacle within a first predetermined vertical distance of the load. The processor may provide further control signals to the hoist drive mechanism controller to elevate the load when the obstacle location and identification information is determined by the processor to indicate an obstacle within a second predetermined vertical distance of the load. In some embodiments, the first and second predetermined vertical distances are equivalent.

The processor may provide control signals to the rotational drive mechanism controller to stop rotation of the boom when the obstacle location and identification information is determined by the processor to indicate an obstacle within a predetermined horizontal distance of the load.

In some embodiments, the detector further comprises a plurality of sensors effective for gathering data related to obstacle shape and location within a potential path of the load. The detector may comprise at least one sensor effective for gathering data related to a shape and position of the load.

The invention of the present disclosure, in another aspect thereof, comprises a method of avoiding contact between a load being moved by a crane and obstacles potentially in the path of the load. The method includes providing a detector that provides obstacle location information, and providing a processor that receives the obstacle location and identification information from the detector and determines obstacle avoidance data in response thereto. The method includes providing a rotational drive mechanism that rotates a boom of the crane relative to a base of the crane on a support surface, and providing a hoist drive mechanism that elevates and lowers a load from the boom. The method also includes providing a rotational drive mechanism controller that receives control signals from the processor based on the obstacle avoidance data to control rotation of the boom when the obstacle location and identification information is determined by the processor to indicate an obstacle within a first predetermined distance of the load. The hoist drive mechanism controller receives control signals from the processor based on the obstacle avoidance data to control elevation of the load when the obstacle location and identification information is determined by the processor to indicate the obstacle is within a second predetermined distance of the load.

In some embodiments, the first and second predetermined distances are equivalent. The method may further comprise providing control signals from the processor to the rotational drive mechanism controller to stop rotation of the boom when the obstacle location and identification information is determined by the processor to indicate the obstacle is within the first predetermined distance of the load. The method may include providing control signals from the processor to reverse lowering the load when the obstacle location and identification information is determined by the processor to indicate the obstacle is within the second predetermined distance of the load.

DETAILED DESCRIPTION OF THE PREFERRED EMBODIMENTS

Figure 1:
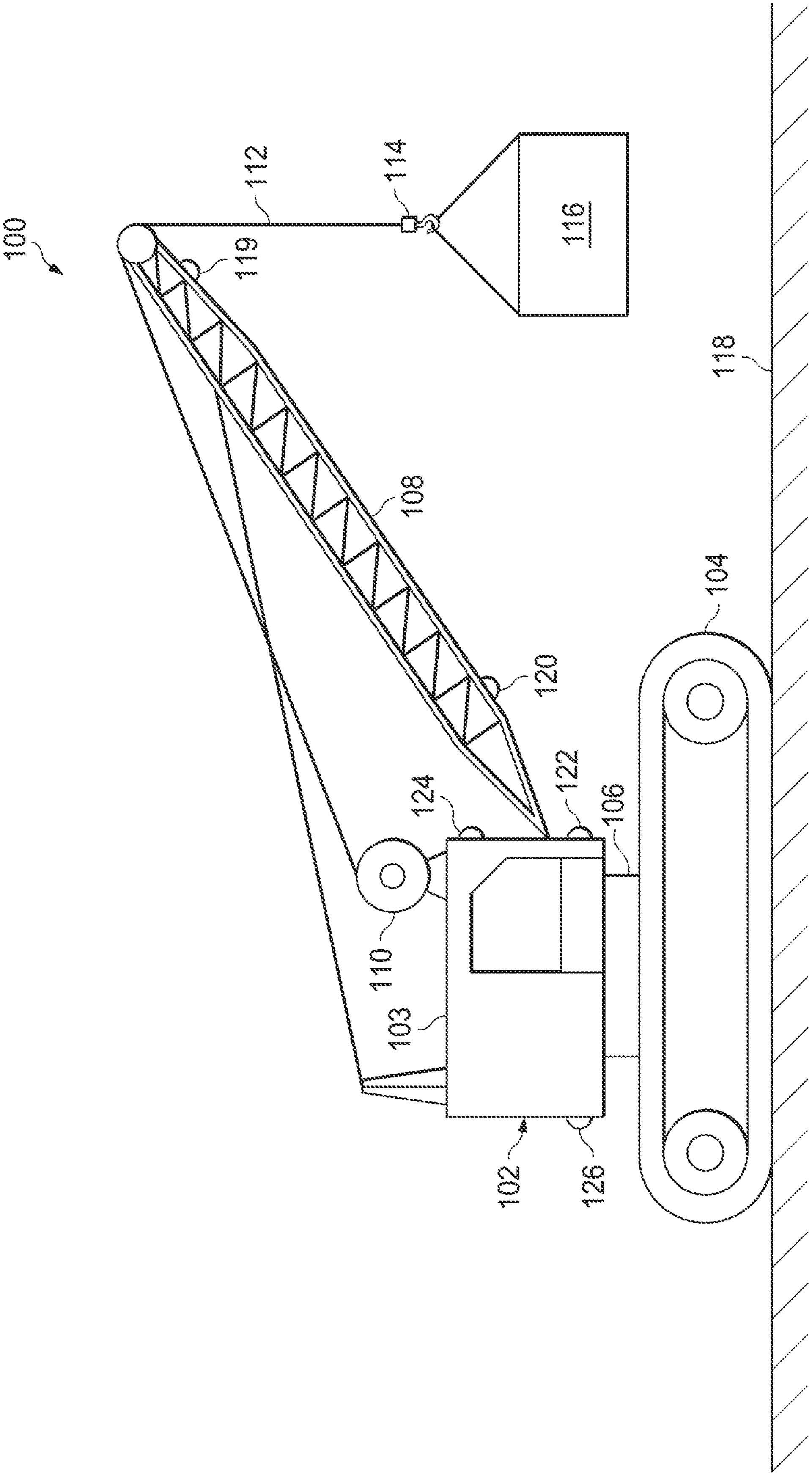
FIG. 1 is a perspective view of a boom crane.

FIG. 1 is a perspective view of a boom crane 100. This represents one type of crane, as is known in the art, with which embodiments of the present disclosure may operate. Other types of cranes or lifting devices may also be used with systems and methods of the present disclosure. These would include, but are not limited to, lattice work cranes, tower cranes, loader cranes, truck mounted cranes and others. Embodiments of the present disclosure may be retrofitted to operate on existing cranes or may be integrated with a crane at the time of manufacture.

The crane 100 comprises an upper portion 102, which may provide a cab 103 and other working components, affixed in a rotational articulating fashion to a base 104. The base 104 may provide locomotion and gross positioning for lifting, moving, and other work performed by the crane 100. The upper portion 102 may be fixed to the base 104 by a rotational drive mechanism 106. The rotational drive mechanism 106 may also be known as a rotex gear. The rotational drive mechanism 106 may comprise a slew ring and associated powered drive gears and controllers.

The upper portion 102 provides a boom 108 from which loads may be lifted and moved. A single-piece boom 108 is shown but it should be understood that multi-piece booms with jibs and other subcomponents may be utilized. A hoist mechanism 110 or winch spools and unspools winch line 112 for lifting and lowering loads using a load hook 114. The winch line 112 may comprise a woven steel cable or other winch line as is known in the art. The load hook 114 may or may not comprise an actual hook. The load hook 114 serves as a location for securement and release of an associated load 116. Here, the load 116 is shown as a simple box but other loads of varying types are contemplated herein.

In addition to lifting and lowering, the crane 100 also rotates the boom 108 as a component of the upper portion in relation to the base 104. Thus, loads may be lifted and moved based on manipulation or rotation of the rotational drive mechanism 106 and the hoist 110. The base 104 may remain stationary with respect to a work surface 118 when loads are being manipulated. The work surface 118 may be a piece of ground or concrete at a work site, for example. The crane 100 may include various outriggers, counterweights, and additional components as are known in the art.

Figure 4:
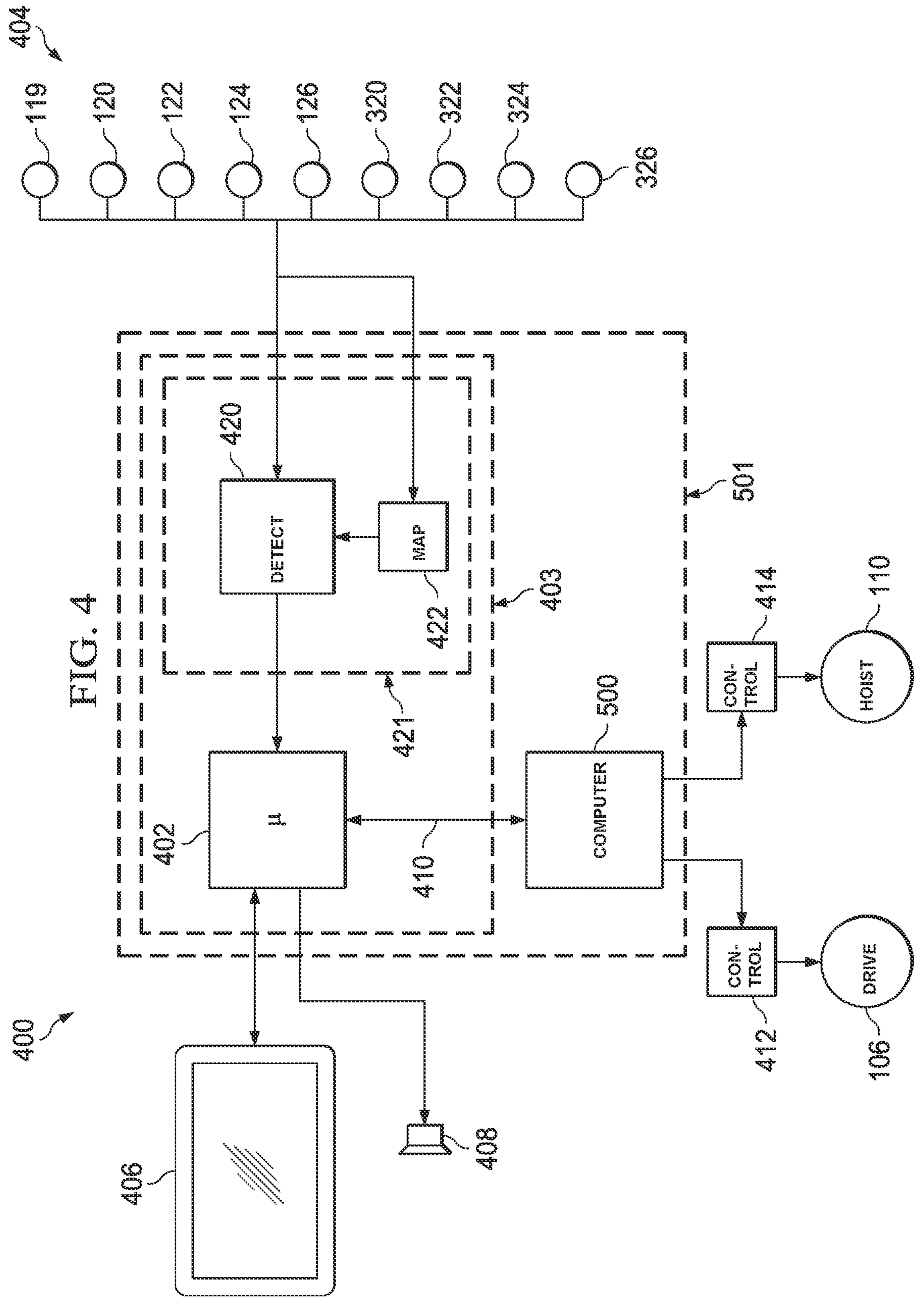
FIG. 4 is a block diagram of a work area monitoring system according to aspects of the present disclosure.

According to various embodiments of the present disclosure, one or more sensors (e.g., 118, 120, 122, 124, 126) may be provided at various locations on or around the crane 100 to obtain and report information for a detector (420, FIG. 4). The detector 420 is described in greater detail below but relies on one or more sensors (e.g., 118, 120, 122, 124, 126) to provide real time monitoring of the work area around the crane 100. Here, a distal boom sensor(s) 118 is placed to provide a high, "birds eye" view of the area surrounding the load 116. A proximal boom sensor(s) 120 provides for a view of an area around the load 116 nearer to the crane. In some embodiments, cab mounted sensors 122, 124 may provide views similar to that of the operator but would be able to provide information digitally to the detector 420. One or more rear sensor(s) 126 may provide reverse views to aid in avoiding contact at the rear of the cab 103 during rotation. Side sensors (not shown) may also be utilized. The various cab-mounted sensors 122, 124, 126 may provide angles and views from various elevations to the detector 420.

Sensors of the present disclosure (e.g., 118, 120, 122, 124, 126) may be optical cameras or sensors providing data that may be digitally processed for identification of obstacles (moving or stationary). Sensors may also comprise infrared or heat sensors. Ranging lasers (e.g., LIDAR) or sonic sensors may also be used. In some embodiments, one or more of the sensors (e.g., 118, 120, 122, 124, 126) comprise a sensor pod wherein multiple types of sensors may be operational from approximately the same angle or location (e.g., visual and laser).

Figure 2:
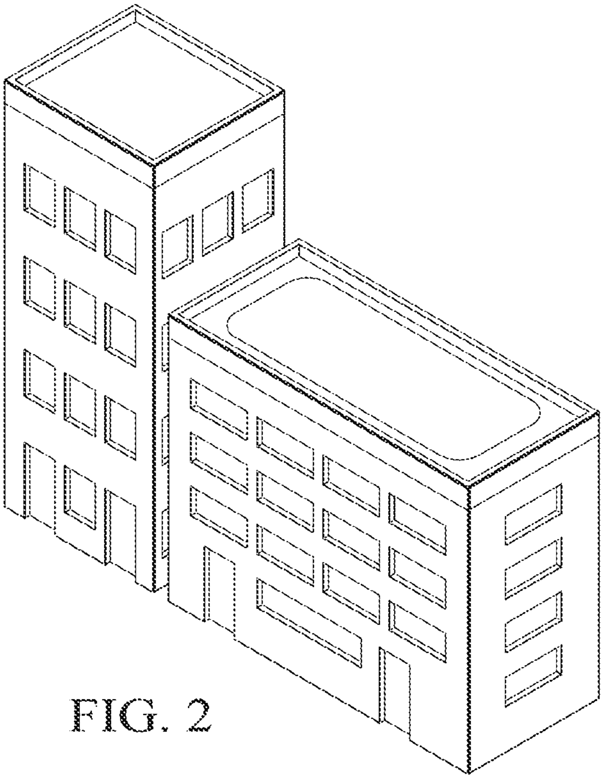
FIG. 2 is a perspective 3D scan of a building.

FIG. 2 is an exemplary perspective 3D scan of a building. Such scans can be developed and then utilized with the present system(s), or can be generated, as needed by various embodiments of the present disclosure. Buildings may comprise obstacles within a work area that previously had to be taken into account solely by the crane operator (i.e., manually or visually) to allow trouble free or safe operation of a crane near the building. Embodiments of the present disclosure can detect 3D obstacles, such as buildings, and ensure that the crane 100 is not operated in such a way that the load 116, winch line 112, boom 108, or other part of the crane 100 comes in contact with, or damages, the obstacle.

In some embodiments, a mapper 422 (FIG. 4) provides initial data pertaining to known structures, landscapes, and other static obstacles. This data may be supplemented in real-time by the detector 420. In some embodiments, the detector 420 and the mapper 422 represent functions occurring on the same processor or controller. In other embodiments, a base map may be provided (e.g., from a previous scan, architectural data, or another source) and stored in memory associated with the mapper 422 or another processor or process. The detector 420 and associated sensors may then detect changes within the work environment to supplement the base map in real time.

Figure 3:
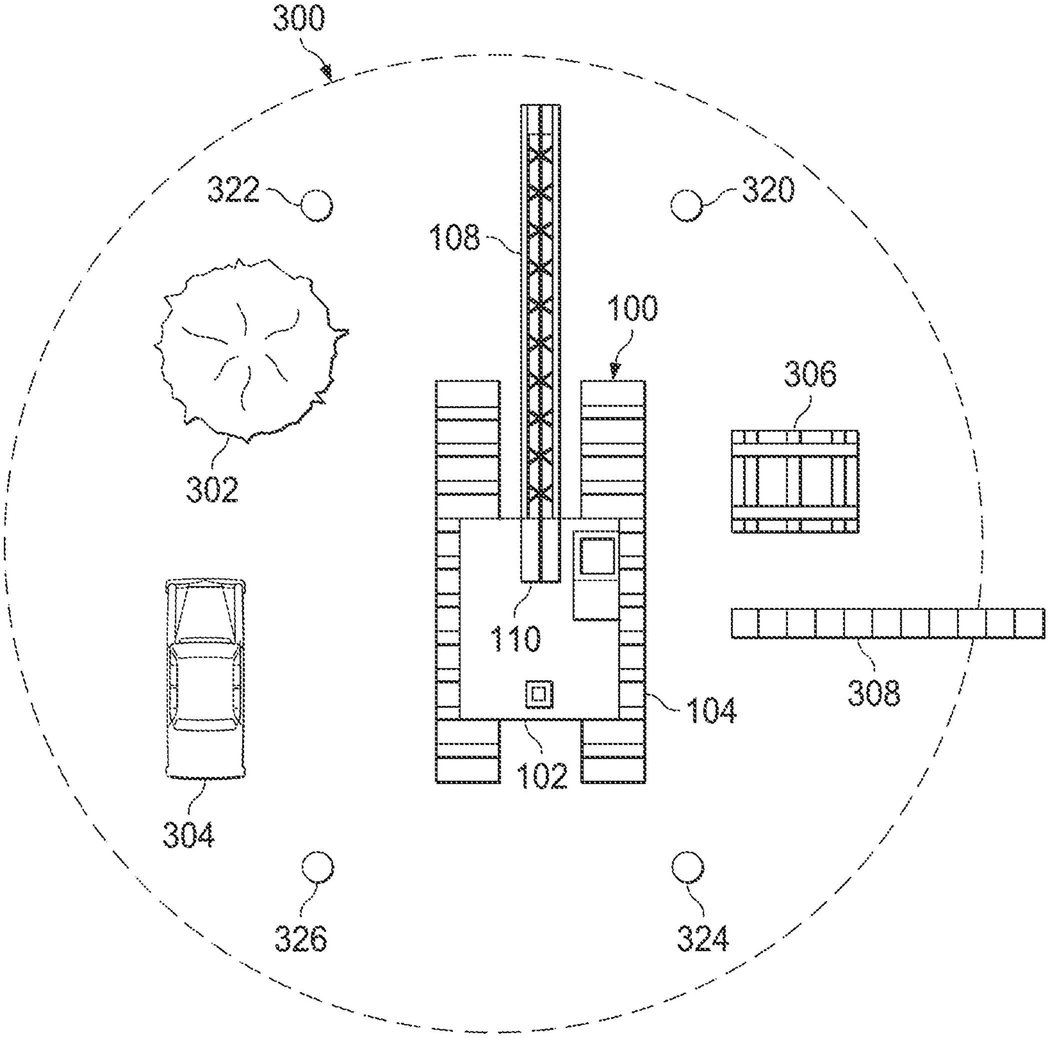
FIG. 3 is a plan view of a boom crane and associated work area.

FIG. 3 is a plan view of a boom crane and associated work area. The crane 100 may be situated within a construction site or work area. In the present embodiment, the crane 100 may rotate up to 360° and therefore the work area (or potential work area) is defined by the circle 300. The work area 300 may contain a number of obstacles such as tree 302, vehicle 304, construction materials 306, and wall 308. Obstacles that may exist or move into a work area are not limited to those specified.

A crane operator seeks to remain aware of the work area such that obstacles may be avoided. Systems and method according to the present disclosure detect obstacles in the work area and may attempt to classify the obstacles such that they may be dealt with appropriately. The tree 302 may be too high to allow a load to be lifted over. Thus, the boom of the crane 100 simply cannot traverse or lift over this obstacle. On the other hand, the vehicle 304 may be easily lifted over, but such a maneuver may not be expedient or permitted. Therefore, the tree 203 and the vehicle 304 may be treated similarly by systems and methods of the present disclosure in preventing the crane boom from traversing these areas.

Construction materials 306 may be lifted over, and such a maneuver may be perfectly acceptable (depending on materials). Similarly, it may be necessary or expedient to lift a load over on obstacle such as a wall 308. In these cases, the systems and methods of the present disclosure will not prevent traversal of these areas but may only allow so when the load is sufficiently lifted. In some embodiments, the crane operator is warned from allowing the load or part of the crane to contact one of these obstacles. In some embodiments, the systems and methods of the present disclosure will automatically reposition a load, slow or stop the load, boom, etc., from coming into contact with the obstacle.

In some embodiments, systems and methods according to the present disclosure may only allow the load hook 114 or the load 116 to come within a predetermined horizontal or vertical distance of a detected obstacle. In other embodiments, the total distance from the obstacle may be monitored instead of, or in addition to, separate vertical and horizontal distances. Further, these distances may change depending upon the load (e.g., its shape, weight, and susceptibility to damage, etc.) or the obstacle (e.g., its speed or susceptibility to damage).

As obstacles change or move, or the crane 100 relocates, the systems and methods of the present disclosure update based on sensor input such that the work area 300 is always monitored and obstacles therein classified. The systems and methods of the present disclosure map the worksite and aid the operator in avoiding obstacles. They provide the operator with an automated setup for ease of use and feedback of any changes to worksite. Systems and methods of the present disclosure may allow the operator to focus all attention on the actual movement of the load or job being done. This system can be used in any application requiring movement of a load, such as utility, AWP, cranes, on-shore energy and recovery.

The systems and methods of the present disclosure may be provided with an interface that is easy to use and intuitive. Initial scans may be completed when the device (e.g., crane 100) is powered on or initialized for use. The worksite and work area may be continually monitored thereafter. Scans of the work area may be stored for future reference or other data logging/data mining activities. People entering the worksite may be registered by the system and loads or crane components may be prevented from operating within a specified distance of such person.

As discussed above, the crane 100 as illustrated in FIG. 1 may be provided with a plurality of sensors or sensor pods at various locations on the crane 100. In some embodiment, remote sensors are also provided. As shown in FIG. 3, two front remote sensors, left front sensor 322 and right front sensor 320 are communicatively couple to provide data to the detector 420. Here, the sensor 322 is placed behind the tree 324 as a static obstacle for which crane mounted sensors may not obtain a full view in some cases. Left rear sensor 326 and rear right sensor 324 are also shown in possible locations relative to the crane 100. It should be understood that particular placement of any possible remote sensors is not limited to the configuration shown. It should also be understood that more or fewer sensors may be deployed than are specifically described or shown.

Remote sensors (e.g., 320, 322, 324, 326) may be self-powered and may also comprise multiple types of sensors such that a sensor pod is formed. In other embodiments, one or more of the sensors 320, 322, 324, 326 may be required to connect to a power source to operate. The sensors may have a wired connection to the crane 100 (e.g., sensor 326) or may have wireless capabilities (e.g., sensors 320, 322, 324). Wireless protocols may include Bluetooth® or others.

Referring now to FIG. 4, a block diagram of a work area monitoring system 400 according to aspects of the present disclosure is shown. FIG. 4 represents one high level implementation of the system 400 but others may be envisioned according to and following the present disclosure. The system 400 illustrates some important components of a work area monitoring system considered apart from certain parts of the lifting machine (e.g., crane 100) to which it is operationally coupled.

The system 400 may be based around a microcontroller 402, which may be a programmable controller. The microcontroller 402 may be part of a general-purpose computing system or may be application specific. In some embodiments, the microcontroller 402 may execute programming according to the present disclosure while performing other duties as well. In other words, the present system 400 may be a dedicated system that may or may not communicate with other on-board systems (e.g., via CAN bus), or it may be integrated as part of a crane or winch control computer that also directly controls lifts and crane movements based on operator inputs.

The controller 402 may accept inputs from one or more sensors as shown in sensor array 404. Sensors 118, 120, 122, 124, 126, 320, 322, 324, and 326 may be part of the array 404. These may include, but are not limited to, video sensors, radar-based sensors, sonic sensors, laser sensors, audio sensors, infrared sensors, temperature sensors, and others. Physically, the sensors 404 may be located anywhere on the crane or other device for which they may provide useful input in establishing or monitoring obstacles in the work area.

The controller may also provide an I/O panel 406 for the user. This may be a touch screen or other device. In some embodiments, displays are separated from inputs such that the screen may be used for display buttons, knobs, keys, etc. utilized for input. Where the system 400 provides audio feedback, one or more speakers 408 may be utilized as well. It should be understood, that power supplies, amplifiers, relays, and other devices as well known in the art are not shown in FIG. 4 for clarity. I/O panel 406 as well as the speaker 408 may be located inside the crane cab 106 to be accessible to the crane operator.

The system 400 may communicate with other existing controllers via a bus 410. Bus 410 may be a CAN bus or other communication means as known in the art. In other embodiments, the bus 410 may be replaced by a dedicated connection rather than a shared bus. Here, the system 400 is shown in communication with a crane control computer 500, which in turn comprises or controls a rotational drive mechanism controller 412 controlling the rotational drive mechanism 106. The computer 500 may also provide or communicate with a hoist drive mechanism controller 414. Where other components associated with a crane or other lifting machine have control over the position of a load, these too may be controlled by the control computer 500 and receive information and commands from the controller 402 of systems and methods of the present disclosure.

Information related to the work area and potential obstacles may be provided to the controller 402 from the detector 420. The detector 420 may comprise a dedicated microcontroller or processor or may represent a process on a general-purpose or multi-purpose processor or CPU. Algorithms may be executed on the detector 420 that are known in the art to identify, recognize, and/or categorize obstacles in the environment. The detector 420 may also locate and/or recognize loads being moved by the associated crane into which system 400 is installed such that the location and path of the load can be correlated to the location of obstacles. In the case of a moving obstacle, such as a vehicle or person, the detector 420 may correlate the potential paths of the load and the obstacle such that collisions may be avoided.

The mapper 422 may represent a controller, or a process on a controller, that may provide baseline mapping data for the work area. This baseline data may be computed, possibly based on input from the sensor array 404, or may be provided from an electronic memory or other storage media. The mapper 422 may also represent a non-volatile memory such that baseline information related to the work area may be stored for rapid retrieval upon startup of the system 400.

It should be understood that both the detector and mapper may comprise an integrated logical unit 421. They may be implemented on the same physical processor, for example. In another embodiment, they may be implemented as part of the same program and set of algorithms and/or functions as are known in the art to provide real-time 3D environmental data for use by other controllers, computers, processors, or processes. Accordingly, the controller 402 may execute the processes or programs associated with the detector 420 and/or mapper 422 such that all three logical functions are integrated into an obstacle avoidance control and computation system shown by line 403.

As illustrated, the controller 402 (or the system 403) provides control signals to the crane control computer 500, which, in turn, operates the rotational drive mechanism controller 412 and/or the hoist drive mechanism controller 414 accordingly. However, in other embodiments, the controllers 412, 414 are processes executing on the crane control computer 500. In further embodiments, some functions of the crane control computer 500 may be integrated with all or some of the functions of the obstacle avoidance and computation system 501. Thus, the systems and methods of the present controller may be based upon existing crane control systems, or may be separately implemented and interconnected with an existing crane control system.

In some embodiments, the environment or work area being monitored may be displayed for the crane operator on I/O panel 406. This allows the crane operator to know which obstacles to avoid. In some cases, crane and/or boom and load position are indicated as well. The view may be overhead (e.g., as in FIG. 3) or in another useful view. If it appears based on sensor reading that the load, boom, or other portion of the crane is going to come into contact with an obstacle, a warning may be provided (by I/O panel 406 and/or speaker 408). If the controller 402 determines it is necessary, a signal may be provided to the crane controller 500 via bus 410 to stop rotation and/or lifting of the load. The controller 402 may first provide a command to slow movement of the load such that it does not swing into obstacles. The controller 402 may be arranged to take precedent over inputs of the crane operator. As mentioned above, if the load may be moved by further elevation (rotation being allowable), the controller 402 may provide instructions to the controller 500 to elevate the load further during, or before, rotation of the boom.

Depending upon the load 116 being moved, it may not be enough to halt movement of the load 116 or boom 108 immediately before coming into contact with an obstacle. In such case, the load 116 might swing into the obstacle even if the boom 108 has stopped. Instead, movement speed of the load must slow prior to coming into close proximity to the obstacle such that a safe stop can be made. Such control signals may be provided to or implemented by the crane control computer 500.

Figure 5:
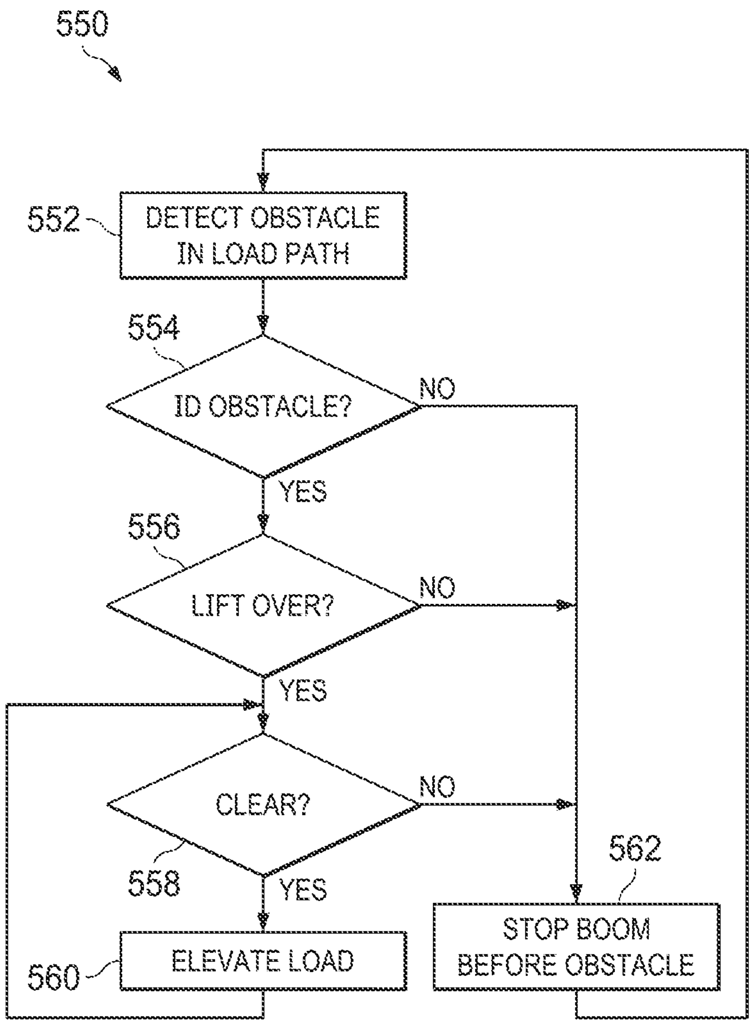
FIG. 5 is a flow chart describing one more operation of a work area monitoring system according to aspects of the present disclosure.

Referring now to FIG. 5, a flow chart 500 describing one more operation of a work area monitoring system according to aspects of the present disclosure is shown. Such logical operations as these may take place, for example, on the microcontroller 402 and/or crane control computer 500. During operation of a crane, the system may detect an obstacle in the load path at step 552. If the obstacle can be identified at step 554, a determination may be made if the identified obstacle is of a class of obstacles which are allowed to have a load lifted, suspended, or passed over at step 556. If the load may be lifted over the obstacle, a determination may be made at step 558 as to whether the load can be made to clear the obstacle. If so, the load is elevated until it clears at step 560.

If the obstacle cannot be identified at step 554, it is determined it cannot be lifted over at step 556, or there is insufficient clearance to lift over at step 558 the boom 108 must be prevented from moving the load into the detected obstacle at step 562. As discussed, this may involve slowing or stopping the boom 108 at a sufficient distance from the obstacle so that the load does not swing into the obstacle. It should be understood that even when a single obstacle is identified and dealt with accordingly, monitoring for new obstacles should continue by return to step 552 as load or boom direction may change and/or new obstacles may enter the work area.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A system for avoidance of obstacles by a crane, the system comprising:

a rotational drive mechanism that rotates a boom of the crane relative to a base of the crane on a support surface;

a hoist drive mechanism that elevates and lowers a load on a load hook from the boom;

at least one detector that provides obstacle location and identification information based upon sensing a position of the obstacle itself in three dimensions, and provides load position information based upon sensing a position of the load itself in three dimensions; and a microcontroller that receives the obstacle location and identification information and the load position information from the detector and provides obstacle avoidance data in response thereto;

a rotational drive mechanism controller that receives control signals from the microcontroller to halt rotation of the boom in the direction of the obstacle when the obstacle location and identification information is determined by the microcontroller to indicate an obstacle within a predetermined distance of the load;

wherein the at least one detector includes a boom detector positioned on the boom distally from the base of the crane to provide the obstacle location and identification information beyond the base of the crane including any outriggers.

2. The system of claim 1, further comprising a hoist drive mechanism controller that receives control signals from the microcontroller to halt lowering of the load hook when the obstacle location and identification information is determined by the microcontroller to indicate an obstacle within a predetermined distance of the load.

3. The system of claim 1, further comprising:

a rotational drive mechanism controller that receives rotational drive control signals from the microcontroller to halt rotation of the boom when the obstacle location and identification information is determined by the microcontroller to indicate an obstacle within a predetermined horizontal distance of the load; and a hoist drive mechanism controller that receives hoist drive control signals from the microcontroller to halt lowering of the load when the obstacle location and identification information is determined by the microcontroller to indicate that the obstacle is within a predetermined vertical distance of the load.

4. The system of claim 1, wherein the detector comprises an optical camera.

5. The system of claim 1, wherein the detector comprises a radar.

6. The system of claim 1, wherein the detector comprises a sonic sensor.

7. The system of claim 1, wherein the detector comprises a laser.

8. The system of claim 1, further comprising a mapper that provides a base map of an operating area, including known static obstacles, to the microcontroller, and wherein the microcontroller provides obstacle avoidance data in response thereto.

9. The system of claim 1, further comprising an alarm that is activated by the microcontroller when the obstacle location and identification information is determined by the microcontroller to indicate an obstacle within a predetermined distance of the load.

10. The system of claim 1, wherein the obstacle location and identification information is utilized by the microcontroller to determine whether a detected obstacle belongs to a class of obstacles over which the load may be passed.

* * * * *